United States Patent [19]

Latimer et al.

[11] Patent Number: 4,520,414
[45] Date of Patent: May 28, 1985

[54] MAGNETIC TRANSDUCER STRUCTURE WITH IMPROVED MECHANICAL COUPLING AND METHOD OF MANUFACTURING

[75] Inventors: Stanley M. Latimer, San Jose; Gregory A. Orton, Fremont, both of Calif.

[73] Assignee: Ampex Corporation, Redwood City, Calif.

[21] Appl. No.: 429,909

[22] Filed: Sep. 30, 1982

[51] Int. Cl.³ .............................................. G11B 5/12
[52] U.S. Cl. .................... 360/125; 360/121; 360/127; 29/603
[58] Field of Search .............................. 360/125–127, 360/120–121; 29/603

[56] References Cited

U.S. PATENT DOCUMENTS 3,369,292 2/1968 Manders .................................. 29/603
4,351,104 9/1982 Klagane et al. ........................ 29/603

Primary Examiner—John H. Wolff
Attorney, Agent, or Firm—Elizabeth E. Strnad; Joel D. Talcott

[57] ABSTRACT

A magnetic transducer assembly having separate core portions with keyways provided therein. The core portions are assembled to form a substantially closed magnetic circuit defining a transducing gap. The keyways form recesses which are contiguous with a transducer inner space provided by the assembled cores. The inner space and recesses are filled with a non-magnetic bonding material. The resulting bond improves the mechanical coupling between the core portions.

47 Claims, 18 Drawing Figures

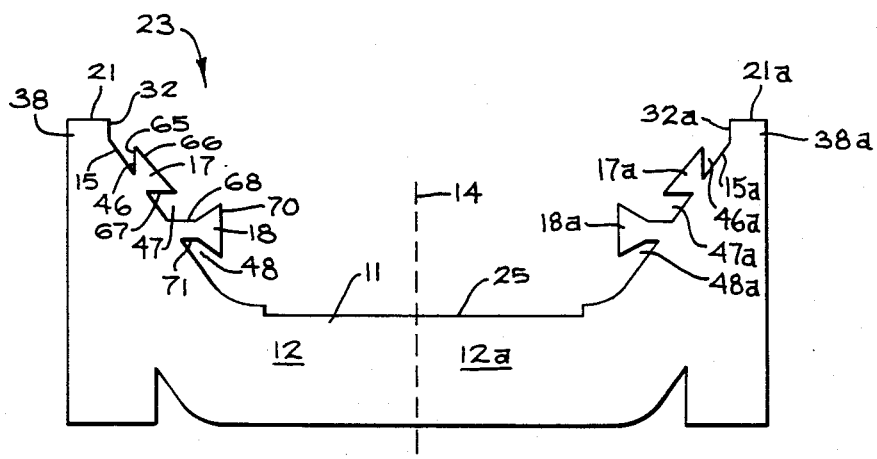
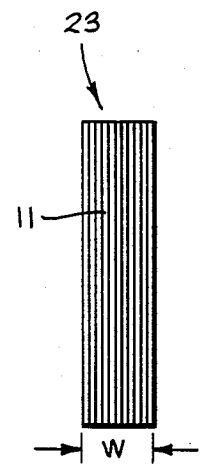
FIG_1A
FIG_1B
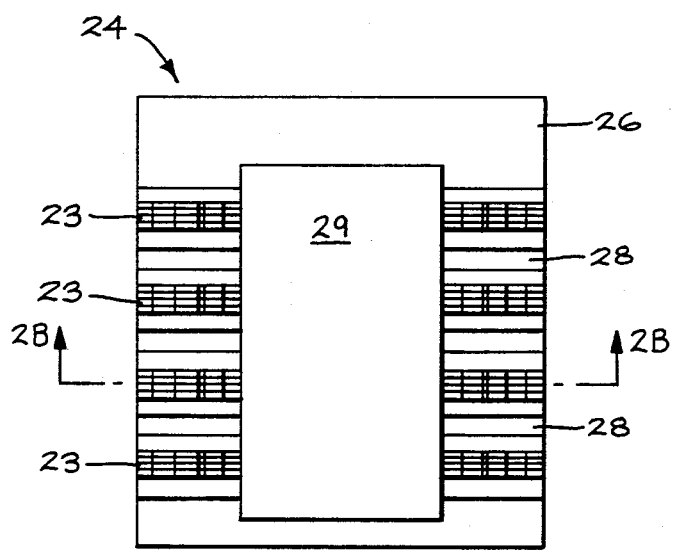
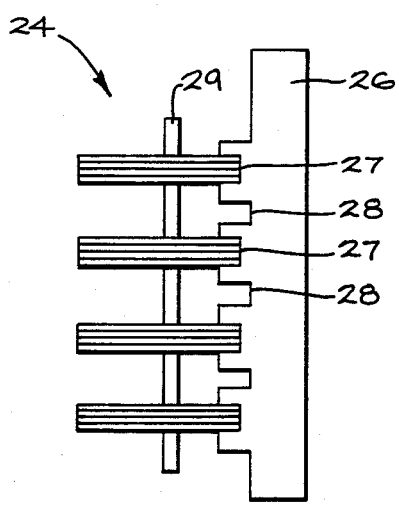
FIG_2A
FIG_2C
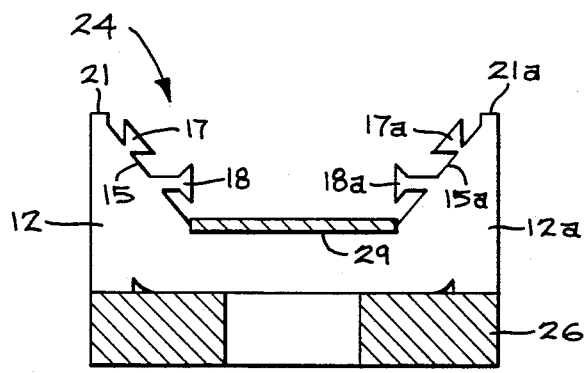
FIG_2B

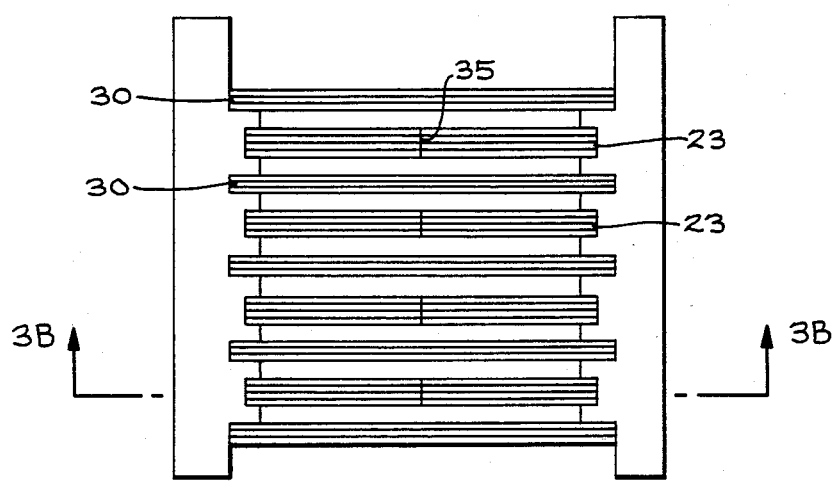
FIG_3A
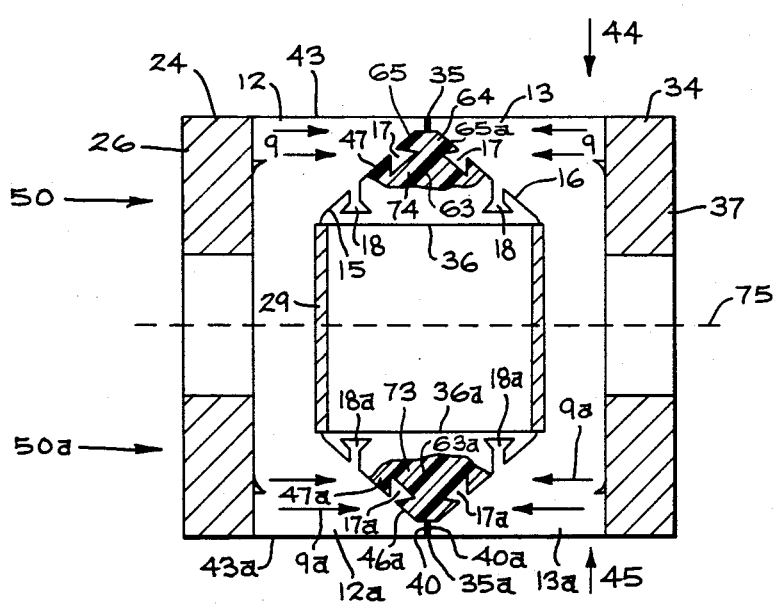
FIG_3B

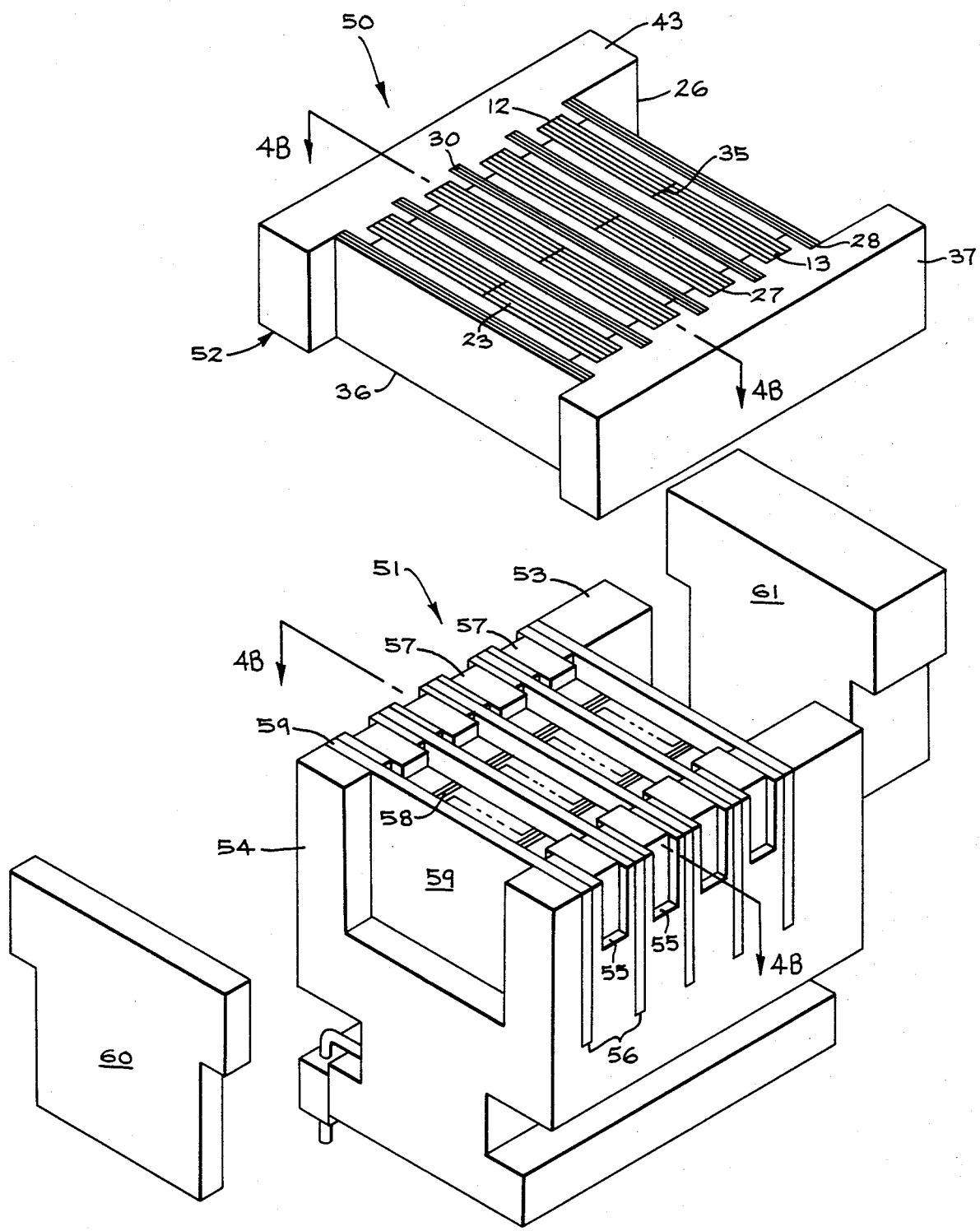
FIG_4A

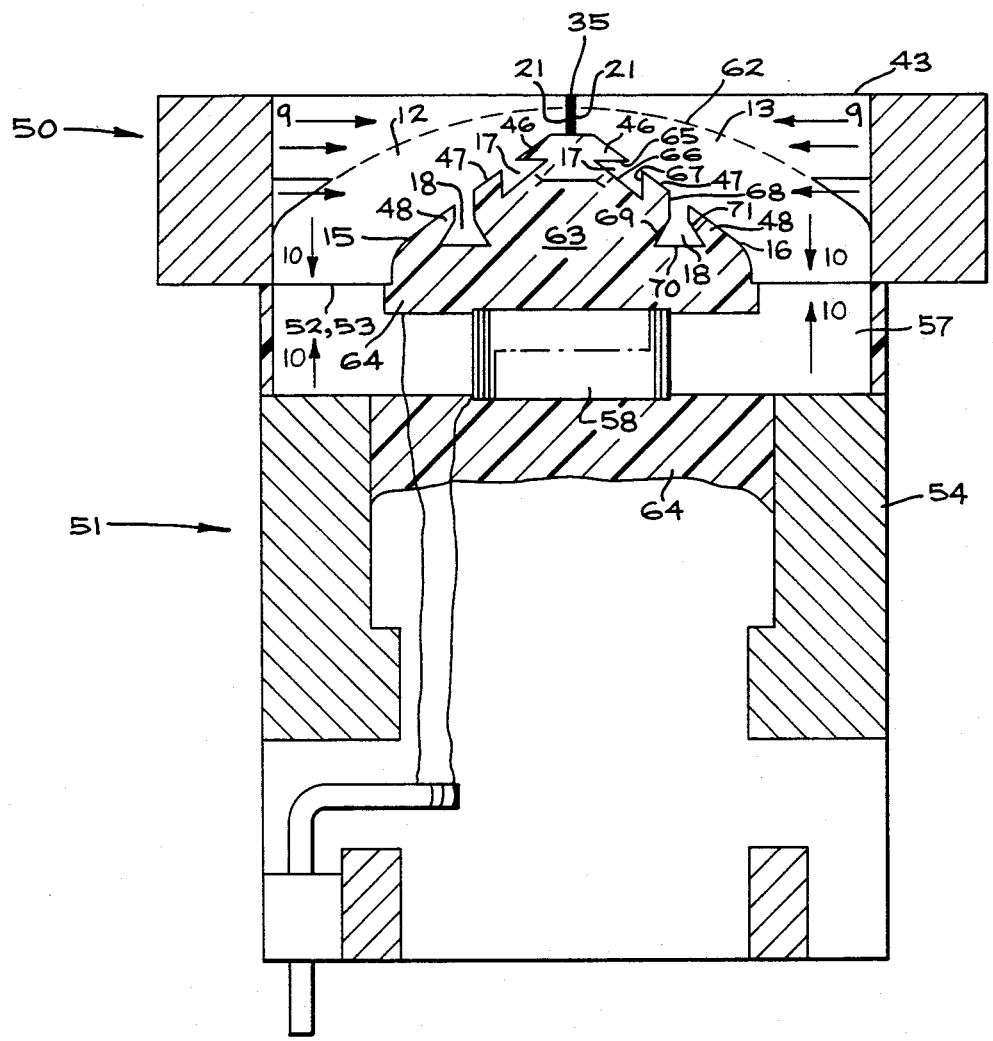
FIG_4B

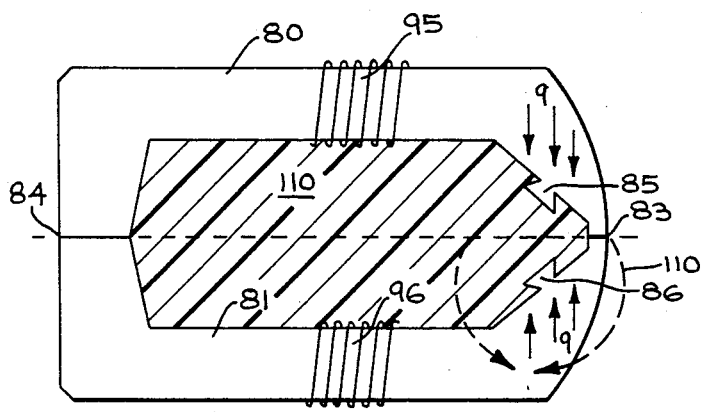
FIG_5A
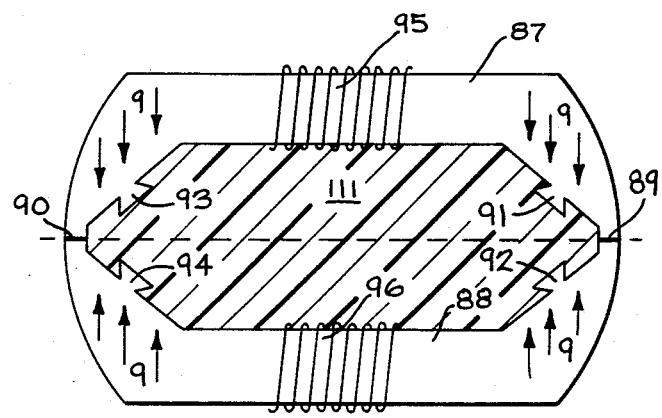
FIG_5B
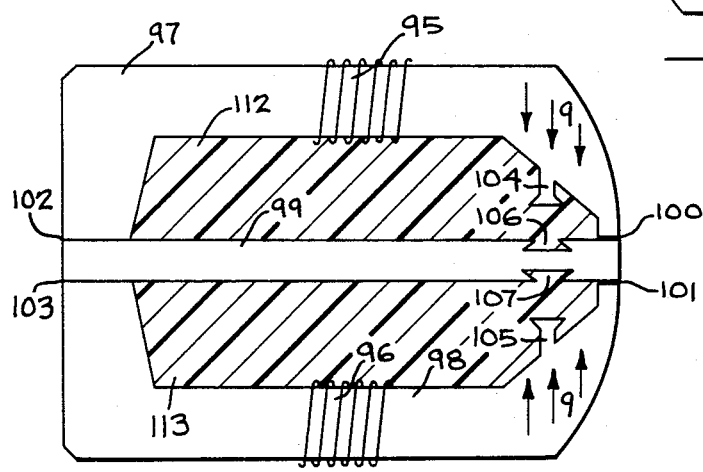
FIG_5C
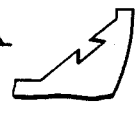
FIG_6A
FIG_6B
FIG_6C
FIG_6D
FIG_6E
FIG_6F

MAGNETIC TRANSDUCER STRUCTURE WITH IMPROVED MECHANICAL COUPLING AND METHOD OF MANUFACTURING

The invention relates to a magnetic transducer structure and manufacturing method having separate core portions joined together with a nonmagnetic bonding material to form a substantially closed magnetic transducing circuit with improved mechanical coupling between the separate core portions.

Magnetic transducers are known to have two or more separate core portions which are assembled to form a substantially closed magnetic circuit including confronting magnetic poles separated from each other by a nonmagnetic transducing gap material. When the separate core portions of such transducers are bonded together by a nonmagnetic bonding material, such as epoxy, a loosening of the mechanical coupling between the poles is often encountered due to poor adhesion of the bonding material to the surrounding surfaces. Resulting widening or deforming of the transducing gap causes lower performance and frequently rejection of the entire transducer structure. It is known to improve adhesion of the bonding material by roughening the bonding surfaces, for example by sand blasting or other well know techniques and thereafter cleaning the surfaces by a suitable solvent. However, in magnetic transducer assemblies where the various elements including cores, shields and spacers are in closely spaced lateral arrangement such as in high density multichannel structures the lateral surfaces are not readily accessible for the roughening and cleaning process. In addition when laminated core structures are bonded together it is necessary to protect the edges of the laminated cores from roughening to prevent electrical shorts between the closely spaced laminations.

SUMMARY OF THE INVENTION

Consequently, it is an object of this invention to provide a rigid magnetic transducer structure and method having improved mechanical coupling and stability between respective separate core portions which are bonded together by means of a nonmagnetic bonding material.

It is a further object of the invention to provide a bonded laminated multichannel magnetic transducer structure with improved mechanical coupling between a plurality of elements forming closely spaced parallel transducing channels.

It is still another object to provide a magnetic transducer structure and method having the above-indicated features and advantages and adapted for economical production.

According to an improved aspect of the invention keyways are provided in the respective magnetic core portions to form recesses contiguous with an inner space of the transducer which inner space and recesses are filled with a nonmagnetic bonding material.

It is noted that in the present application the term keyway is utilized to designate a suitable protrusion extending from an inner side of a magnetic core portion into an inner space of the transducer or alternatively, to designate a suitable groove extending from that inner side into the core portion, respectively. In either case one or more suitable recesses are formed by each keyway which recesses are contiguous with the inner space formed between the individual core portions when they are assembled to form a substantially closed magnetic circuit.

It has been discovered in accordance with the present invention that when magnetic core portions comprising such keyways are bonded together by applying a suitable nonmagnetic bonding material which surrounds the keyways and fills the recesses provided thereby, internal forces develop within the bond which draw these core portions together thus improving the mechanical coupling between the core portions.

It is a further aspect of this invention that corresponding keyways are provided in separate core portions in a confronting relationship with each other at opposite sides of the tranducing gap to improve mechanical coupling and stability of the transducing gap when the core portions are bonded together.

These and other objects and advantages of the invention will become apparent from the following description and accompanying drawings.

BRIEF DESCRIPTION OF THE DRAWINGS

FIGS. 1A and 1B are respective plan and side views of a dual laminated magnetic front core portion illustrating method steps in accordance with the preferred embodiment of the invention.

FIGS. 2A to 2C are respective plan, cross-sectional and side views of a dual multichannel front core carrier assembly illustrating further preferred method steps of the invention.

FIGS. 3A and 3B are respective plan and crosssectional views showing a step of joining together two corresponding dual front core carrier assemblies of FIGS. 2A to 2C.

FIG. 4A shows an exploded view corresponding to the step of assembling a front core carrier assembly with a rear carrier assembly to obtain a multichannel transducer structure of the preferred embodiment of the invention;

FIG. 4B is a cross-sectional view taken along line 4B of the assembled multichannel structure of FIG. 4A;

FIGS. 5A to 5C show respective plan views of alternative magnetic core structures in accordance with the invention; and FIGS. 6A to 6F show keyways of various alternative shapes in accordance with the invention.

DETAILED DESCRIPTION OF THE PREFERRED EMBODIMENTS

A multichannel transducer structure in accordance with a preferred embodiment of the invention will be first described with reference to FIGS. 4A and 4B followed by description of the preferred method of manufacturing.

FIG. 4A shows an exploded view of a multichannel transducer comprising a face carrier assembly 50, also referred to as a front core carrier assembly, and a corresponding rear carrier assembly 51. The face carrier assembly 50 comprises front core carriers 26, 37 made of a non-magnetic material, for example aluminum, with parallel core slots 27 provided therein in a known manner for example by machining, to accommodate corresponding pairs of front cores 12,13, each pair defining a transducing gap 35 pertaining to one transducing channel. Magnetic shield slots 28 are also provided in the carriers 26, 37 to accommodate interchannel shields 30 as well known in the art.

With further reference to FIG. 4A, the rear carrier assembly 51 comprises a nonmagnetic back core carrier 54 in which parallel back core slots 55 and back shield slots 56 are provided in a well known manner, for example by machining. Slots 55 are arranged opposite to the above described front core slots 27 and they accommodate magnetic back cores 57 having transducing windings 58 wound thereon as well known in the art and as also shown in FIG. 4B. Back shield slots 56 are provided opposite the above-mentioned front shield slots 28 and they serve to accommodate interchannel magnetic back shields 59 in a well known manner.

The respective face and rear carrier assemblies 50, 51 are joined together with their smoothly lapped corresponding planar surfaces 52, 53 abutting and with the respective front cores 12, 13 and back cores 57 as well as front shields 30 and back shields 59 in precise alignment as it is well known in the art. In the preferred embodiment of FIGS. 4A and 4B the front core carrier 26, 37, the back core carrier 54 and end "T" pieces 60, 61 are assembled and expoxied together in such a manner that insures the lapped surface 36 of the front core carrier 26, 37 have intimate contact with the lapped surface 53 of the back core carrier 54. The end "T" pieces 60, 61 are epoxied to the front core carrier 26, 37 and the back core carrier 54 so as to provide additional mechanical coupling of the front and back carriers together. The "T" pieces 60, 61 are made preferably of the same nonmagnetic material as the front and rear carrier assembly so as to maintain similar coefficient of thermal expansion characteristics.

FIGS. 4A and 4B show the magnetic transducer assembly prior to contouring at the front face 43. A final contour of the transducer assembly is shown in FIG. 4B by interrupted line 62.

In accordance with the teachings of the present invention and with reference to a crosssectional view of FIG. 4B, keyways 17, 18 are provided in the front core halves 12, 13 and arranged in confronting relationship with each other with respect to the plane of the transducing gap 35. In the preferred embodiment these keyways are formed as projections having substantially triangular cross sections and extending from diverging inner sides or walls 15, 16 of front cores 12, 13 into an inner space 63 enclosed by the assembled core portions 12, 13 and 57, respectively. As shown in FIG. 4B the inner space 63 is filled with a suitable bonding material 64, preferably epoxy as it is well known in the art. The keyways 17, 18 provide additional surfaces 65 to 71 for the bonding material 64 to adhere to. In the preferred embodiment these surfaces form acute angles with the inner walls 15, 16 or with the transducing gap plane, respectively. The keyways 17, 18 form recesses 46 to 48 as shown in FIG. 4B. These recesses interrupt the continuity of the inner walls 15, 16 and are contiguous with the inner space 63. The space 63 and the recesses 46 to 48 are filled with a non-magnetic bonding material as it will be described in more detail with respect to the preferred method of manufacturing. After the bond is cured, internal forces which develop within the bond including the recesses formed by the confronting keyways effectively draw the separate core portions together in the direction of arrows 9 as shown in FIG. 4B. It has been observed that this "drawing effect" significantly improves the mechanical coupling between the respective core portions of the preferred embodiment in the transducing gap area. Consequently, the mechanical stability of the transducer is greatly improved when submitted to manufacturing and operational stresses.

Now the preferred method of constructing a magnetic transducer in accordance with the invention will be described with reference to FIGS. 1A to 4B showing respective preferred method steps.

A plurality of dual magnetic front core laminations 11 is made as shown in FIG. 1A. Each lamination 11 is preferably manufactured by well known chemical milling process in which a plurality of laminations is simultaneously etched from a sheet of suitable magnetic material having a desired thickness. In the preferred embodiment a high permeability material, for example type HY-MU 80 1 to 6 mils thick is utilized and laminated in a well known manner. Alternatively the laminations could be made by punching or stamping from a sheet of magnetic material, for example HY-MU 80.

The resulting laminated stack 23 of FIG. 1A includes two indentical front core halves 12, 12a symetrical along line 14. As it has been described previously with reference to FIG. 4B, in each lamination there are provided keyways 17, 18 and 17a, 18a in the form of substantially triangular projections along the inner walls or sides 15, 15a of each front core half 12, 12a, respectively. It will be understood from further detailed description that alternatively these keyways may have other suitable shapes and may be provided either as projections extending outwardly from inner walls of cores 12, 12a or as grooves provided from the inner walls into cores 12, 12a, respectively. On each core half 12, 12a a magnetic pole 38, 38a is formed, respectively each pole having a planar end face 21, 21a corresponding to a transducing gap surface.

With further reference to FIG. 1A, the keyways 17 to 18a provide additional inner wall surfaces 65 to 71 which in the preferred embodiment extend at respectively selected acute angles with respect to the transducing gap, plane or to the inner walls 15, 15a resepctively. The latter additional surfaces form recesses 46 to 48 in core half 12 and 46a to 48a in core half 12a respectively, which recesses are contigous with the inner space 63. The keyways 17 to 18a are preferably placed just below the transducing gap forming surfaces 21, 21a but alternatively or additionally they may be placed at other convenient locations at the inner sides of the magnetic core structure. It will be understood however that the location of these keyways is selected such that they do not interfere with other elements of the magnetic circuit such as the transducing gap, transducing coils wound around the cores, as shown at 58 in FIG. 4B, interchannel spacers, magnetic shields or other well known elements which may be utilized in the multichannel magnetic transducer assembly.

To obtain the laminated core stack 23 a plurality of identical laminations 11 is stacked in precise alignment and laminated in a well known manner, for example utilizing a thermosetting adhesive, type 3M-EC2290. A side view of the laminated core stack 23 is shown in FIG. 1B, corresponding to the plan view of FIG. 1A wherein the thickness w of each finished core stack corresponds to a desired recording track width.

In accordance with the further preferred method steps of the invention and with reference to FIGS. 2A to 2C, a non-magnetic dual front core carrier 26 is made, preferably of aluminum, and parallel magnetic core slots 27 and magnetic shield slots 28 are machined therein in a well known manner. Respective laminated dual core stacks 23 are then inserted and secured in the slots 27, for example by epoxy. Into a thusly formed dual front face assembly 24 a shield stop 29 of a nonmagnetic material, preferably aluminum is inserted and attached for example by epoxy resin to the inner planar surface 25 of the dual front core stacks 23. Alternatively, other well known types of shield stops may be utilized to maintain shields 30 in a desired position within the carrier 26 when they are inserted in slots 28.

Thereafter the magnetic pole faces 21, 21a are lapped and polished to obtain precisely flat and smooth surfaces as necessary to form a transducing gap plane in a manner well known in the art.

The resulting dual front face assembly 24 also referred to as dual front core assembly of FIGS. 2A to 2C is then held in precise alignment with a similarly prepared corresponding assembly 34 as it is shown in FIGS. 3A and 3B with a nonmagnetic, transducing gap forming material 35 superposed between the abutting pole faces 21, 21a and 40, 40a, respectively in a well known manner. In the preferred embodiment the transducing gap 35 is made of a shim of nonmagnetic material, for example mica, 50 to 500 microinches thick. Alternatively, a suitable non-magnetic material, such as silicon dioxide may be deposited on these pole faces by sputtering, vacuum deposition or other well known methods.

The thusly assembled front face structure 24,34 is held in a suitable clamping fixture (not shown) which applies a necessary pressure thereto as it is well known in the art. It is seen from FIG. 3B that in the above described assembly corresponding keyways 17 to 18a of each corresponding core portion 12, 13 and 12a, 13a, respectively, are in confronting relationship with each other across the respective transducing gaps 35, 35a. Interchannel magnetic front shields 30 are then inserted into the respective shield slots 28 of of the dual front core assembly 24, 34 in the direction of arrows 44,45 respectively as shown in FIG. 3B. The shields 30 are preferably rectangular and they are supported at their lower ends 36, 36a by the shield stops 29 as shown in FIG. 3B. In the preferred embodiment shields 30 are made of HY-MU 80 laminations.

While the above-described assembly of FIGS. 3A and 3B is held under pressure in the previously mentioned clamping fixture (not shown), a suitable nonmagnetic bonding material is applied to the lower half 50a of the dual face carrier assembly 24, 34 as shown at 73. In the preferred embodiment the selected bonding material is Epon Resin 815, manufactured by Shell Corporation, preferably mixed with U-Hardener in ratio 5:1. Glass beads between 25% and 50% of the total volume may be added thereto as a filler, as it is known in the art. Bonding conditions are directed by the manufacturer.

The bonding is preferably provided in two steps. The first step is shown in FIG. 3B, where the above indicated bonding material 73 is first applied to fill only that portion of inner space 63a which extends between the confronting keyways 17a and which is immediately adjacent to the rear of the transducing gap 35a. The bonding material 73 is applied to completely surround keyways 17a while completely filling confronting recesses 46a and a portion of confronting recesses 47a. Subsequently, the bonding material is cured in accordance with the conditions determined by the manufacturer. During the curing process internal forces develop in the bond which draw the corresponding core halves 12a, 13a together in a direction of arrows 9a across the transducing gap 35a. After the above described bond 73 is cured, the front face assembly 24, 34 and fixture are turned around by 180 degrees and the above-described bonding process is repeated with respect to face carrier assembly 50 to obtain bond 74. It will be understood from the above description that after the bond 74 is cured, internal forces develop across the gap 35 which effectively draw the respective front core portions 12, 13 together in the direction of arrows 9. The thusly partially bonded structure 24, 34 is then removed from the clamping fixture and is placed into a suitable parting fixture (not shown), as known in the art. The structure 24, 34 is then cut along plane 75 into two corresponding halves 50, 50a each representing a respective individual face carrier assembly. The cutting step is provided preferably by a carborundum circular saw in a well known manner.

Thereafter each thusly separated face carrier assembly 50, 50a is ground at the planar surface 75 until the portion containing shield stops 29 is completely removed and a desired dimension between a front face surface 43 and a the ground planar surface 52 is obtained as shown in FIG. 4A. The surface 52 is then lapped and polished to a desired flatness. It follows from the foregoing description that surface 52 includes thusly lapped and polished lower surfaces of front cores 12, shields 30 and front core carriers 26,37 respectively.

With further reference to FIGS. 4A and 4B a back core carrier assembly 51 is made by providing a back core carrier 54 of nonmagnetic material, preferably of the same type as utilized for front core carriers 26,37 as previously described. Slots 55 for magnetic back cores 57 and slots 56 for magnetic back shields 59 are made in the carrier 54 in a well known manner, such by as gang slotting in a milling machine. The magnetic back cores 57 are made preferably of MnZn ferrite. Transducing coils 58 are wound around each back core as well known in the art and best shown in FIG. 4B. The back core carrier 54 is held in a suitable fixture (not shown) for precisely locating the cores 57 and shields 59 within the respective slots as well known. The back cores with coils 58 thereon are inserted into slots 55 as shown in FIGS. 4A and 4B and magnetic back shields 59 are inserted into slots 56. The cores 57 and shields 59 are attached in the slots 55, 56 in a well known manner, for example by epoxy and thereafter the upper surface 53 of the resulting back core carrier assembly 51 is lapped and polished to obtain a desired flatness.

The corresponding face and back core carrier assemblies 50, 51 are then placed in a suitable bonding fixture (not shown) to obtain precise alignment of corresponding front and back cores 12,57 as well as front and back shields 30 and 59, respectively and these assemblies are held with their respective confronting planar surfaces 52, 53 abutting under a suitable pressure provided by the bonding fixture, as well known.

Thereafter the assembly shown in FIG. 4B is turned by 180 degrees with respect to the depicted position and a non-magnetic bonding material, preferably of the same type as utilized for the above-described bonds 73 and 74 is applied in a known manner to the multichannel transducer. The bonding material is applied to fill the rest of the inner space 63 formed between the front cores 12, 13, and back core 57 while completely surrounding the confronting keyways 18. The bond preferably extends beyond the back core 57, as shown at 64 in FIG. 4B to further strengthen the multichannel bonded structure. It is understood that the thusly obtained bond fills the entire area between the respective lateral surfaces of the front shields 30, front cores 12, back shields 59 and back cores 57 of the multichannel transducer in accordance with the preferred embodiment, respectively.

The resulting bond effects drawing of the respective core portions 12, 13 together with back core 57 in the direction indicated by arros 10. The latter effect is enhanced by the bond 63 surrounding the keyways 18 including the area formed by recesses 47, 48 respectively.

The resulting multichannel transducer structure 50, 51 of FIGS. 4A, 4B is then removed from the bonding fixture. The obtained transducer assembly is contoured in a manner well known in the art at front face 43 to obtain a desired contour, for example as shown by interrupted line 62 in FIG. 4B. It follows from the foregoing description that the stability of the bonded structure is improved significantly in the transducing gap area while the overall transducer structure is strengthened as well. Because of the resulting improved contact between the abutting surfaces of the respective magnetic cores a low reluctance magnetic path is obtained thereby reducing recording/reproducing losses and in turn improving transducer efficiency.

It follows from the foregoing disclosure that the disadvantage of loosening of the bond due to insufficient adherance to relatively smooth inner surfaces of the prior art transducers is significantly reduced in accordance with the teachings of the present invention.

While the respective magnetic core portions 12, 12a, 13 and 13a of the preferred embodiment are laminated, alternatively they may be made of bulk magnetic material and the respective keyways therein may be made by machining. It will be appreciated by those skilled in the art that when the core portions incorporating keyways in accordance with the invention are made for example by chemical milling or similar methods, as above described, there is no appreciable increase in the manufacturing cost when comparing to the cost of prior art cores without keyways.

The invention is not limited to multichannel structure and single channel transducers may be provided as well in accordance with the teachings of the present invention.

FIGS. 5A to 5C show alternative transducer core structures in which keyways in accordance with the present invention are incorporated. Thus in FIG. 5A two corresponding "C" type cores 80, 81 are assembled and joined together to form a substantially closed magnetic circuit including a transducing gap 83 as well known in the art. In accordance with the invention corresponding confronting keyways 85, 86 are provided in each respective core 80, 81 at opposite diverging inner sides below the rear portion of the transducing gap 83.

FIG. 5B shows a further embodiment of the invention wherein two "C" type cores 87, 88, similar to cores 80, 81 of FIG. 5A are assembled and joined to form a substantially closed magnetic circuit including reversible transducing gaps 89 and 90. As well known in the art in the latter type of transducer either gap 89, 90 can be utilized as either a transducing or rear gap, respectively. Corresponding keyways 91, 92 similar to keyways 85, 86 of FIG. 5A, are provided below the rear portion of the transducing gap 89, and additional corresponding keyways 93, 94 are provided in the transducer below the reversible rear gap 90. The respective keyways 91 and 92; 93 and 94 are in confronting arrangement with each other across the transducing gap plane.

A still further example of providing transducer cores with keyways in accordance with the present invention is shown in FIG. 5C representing a dual gap transducer structure comprising two corresponding "C" type cores 97, 98 assembled and joined with a corresponding "I" type core 99 in a manner well known in the art. In accordance with this embodiment of the invention each "C" core 97, 98 has a respective keyway 104, 105 provided below the rear portion of the transducing gap 100, 101 and extending into an inner space 112, 113 respectively . Additional keyways 106, 107 are provided one on each side of the "I" core, respectively, each confronting keyway 104 or 105 of the C-cores. Keyways 106, 107 are made as grooves extending into the "I" core and contiguous with the inner space. It follows from the foregoing description that after the respective transducers of FIGS. 5A to 5C are bonded with a suitable bonding material in a previously described manner internal forces which develop in the respective bonds will draw the respective core portions 97, 98 and 99 together in a direction of arrows 9, that is transversely to the respective transducing gap planes.

It will be understood that instead of the above-described dual gap transducer of FIG. 5C a single gap trandducer comprising a "C" core and "I" core may be provided having confronting keyways as shown at 104 and 105, respectively.

If desired it is possible to provide additional keyways similar to keyways 104 to 107 in the area of back gaps 102, 103 of FIG. 5C or at back gap 84 of the embodiment of FIG. 5A to further strengthen the respective transducer structures.

FIGS. 6A to 6F show examples of various alternative forms and shapes of keyways which may be utilized instead or in addition to the above described shapes. For better comparision with the previously described embodiments FIGS. 6A to 6F depict an area corresponding to an area of the transducer core 81 indicated by interrupted line 110 in FIG. 5A. It will be understood that the keyways may be provided as protrusions contiguous with the magnetic cores such as shown in FIGS. 5A, 6B, 6C, 6E and 5F or as grooves provided into the magnetic corers as shown in FIGS. 5C, 6A and 6D, respectively. Other convenient shapes of keyways in addition to triangular polygonal, circular, etc. as shown may be utilized as well. While it is preferred for the keyways to be located as close to the rear portion of the transducing gap as practical, it is noted that in general they may be provided at any convenient location at the inner walls of the respective magnetic core portions where they do not interfere with the transducing windings or other transducer elements such as shields, spaces, etc.

The alternative embodiments shown in FIGS. 5A to 5C may be provided in multichannel or single channel tranducers, respectively.

Although the invention has been described in conjunction with preferred and alternative embodiments it will be appreciated that various modifications thereof may be made without departing from the spirit and scope of the invention as defined by the appended claims.

What is claimed is:

1. A magnetic transducer assembly having at least one transducing channel, comprising:
 each said channel having at least two separate magnetic core portions assembled with confronting magnetic poles abutting to define a transducing gap therebetween, said assembled core portions forming a substantially closed magnetic transducing circuit forming an inner space;

at least one said separate magnetic core portion having a keyway provided therein, said keyway forming a recess contiguous with said inner space; and a nonmagnetic bond provided in at least a portion of said inner space including said recess for joining said separate magnetic core portions together.

2. A magnetic transducer assembly having at least one transducing channel comprising:

each said channel having at least two separate magnetic core portions assembled with confronting magnetic poles abutting to define a transducing gap therebetween, said assembled core portions forming a substantially closed magnetic transducing circuit forming inner space;

at least two said separate magnetic core portions having respective keyways provided therein, said keyways forming recesses contiguous with said inner space; and a nonmagnetic bond provided in at least a portion of said inner space including said recesses for joining said separate magnetic core portions together.

3. The transducer assembly of claim 2 wherein each said keyway is provided as a protrusion extending outwardly from an inner side of said core portion into said inner space or as a groove extending inwardly from said inner side into said core portion, respectively.

4. The transducer assembly of claim 3 wherein said keyways of said separate magnetic core portions are provided in confronting relationship with each other.

5. The transducer assembly of claim 3 wherein said protrusion or groove has a substantially triangular cross section respectively.

6. The transducer assembly of claim 3 wherein said protrusion or groove has a substantially circular cross section, respectively.

7. The transducer assembly of claim 3 where said protrusion or groove has a substantially polygonal cross section, respectively.

8. The transducer assembly of claim 2 wherein said keyways are respectively provided in a confronting relationship with each other on opposite sides of a transducing gap plane.

9. The transducer assembly of claim 8 wherein said confronting keyways are provided in the proximity of a rear portion of the transducing gap.

10. The transducer assembly of claim 2 wherein said nonmagnetic bond is made of epoxy.

11. The transducer assembly of claim 2 wherein said separate magnetic core portions having said keyways are made of a laminated magnetic material.

12. The transducer assembly of claim 2 wherein said separate magnetic core portions having said keyways are made of laminated metallic magnetic material.

13. The transducer assembly of claim 2 having two front core portions defining said transducing gap therebetween, said front core portions having inner sides diverging from a rear portion of said transducing gap, said transducer assembly further having a magnetic back core portion said respective front and back core portions being assembled with corresponding surfaces abutting to form said substantially closed magnetic transducing circuit and wherein said keyways are provided at said diverging inner walls on opposites sides of a transducing gap plane in a confronting relationship with each other and wherein said recesses provided by said keyways have walls forming acute angles with said diverging inner sides and with said transducing gap plane, respectively.

14. A magnetic transducer assembly having one or more transducing channels comprising:

each channel having two separate magnetic front core portions assembled with confronting magnetic poles abutting to define a transducing gap therebetween and a rear magnetic core portion with a transducing coil wound thereon, said respective front and rear core portions being assembled with corresponding surfaces abutting to form a substantially closed magnetic transducing circuit providing an inner space between said assembled core portions;

said magnetic front core portions having respective inner walls diverging from a rear portion of said transducing gap and having respective corresponding keyways provided at said diverging inner walls of each said front core portion in a confronting relationship with each other on opposite sides of a transducing gap plane, each keyway forming at least one recess contiguous with said inner space; and a nonmagnetic bond joining said respective front and rear core portions together said bond being provided in at least a portion of said inner space including said recesses.

15. The transducer assembly of claim 14 wherein each said keyway is provided as a protrusion extending outwardly from an inner side into said inner space or as a groove extending from said inner side into said core portion, respectively.

16. A magnetic transducer assembly having one or more transducing channels comprising:

each channel having two corresponding generally C-shaped magnetic core portions assembled in confronting relationship with each other to form a substantially closed magnetic transducing circuit defining an inner space between said assembled core portions, each core portion having smoothly lapped respective surfaces defining a transducing gap and a rear gap, respectively;

each said core portion having an inner side diverging from a rear portion of said transducing gap, and corresponding keyways provided at least at said diverging inner walls and in confronting relationship with each other on opposite sides of a transducing gap plane, each keyway forming at least one recess contiguous with said inner space; and a nonmagnetic bond provided in at least a portion of said inner space including said recesses for joining said core portions together.

17. The transducer assembly of claim 16 wherein each said keyway is provided as a protrusion extending outwardly from an inner side of said core portion into said inner space or as a groove extending from said inner side into said core portion, respectively.

18. The transducer assembly of claim 16 wherein said magnetic core portions have further diverging inner walls from a rear portion of a rear gap and wherein further corresponding keyways are provided at said further diverging inner walls in confronting relationship with each other on opposite sides of the transducing gap plane.

19. The transducer assembly of claim 16 wherein said keyways are provided as protrusions from said magnetic core portions into said inner space.

20. A magnetic transducer assembly having one or more transducing channels, comprising;

each channel having a generally C-shaped magnetic core portion in a confronting relationship with a generally I-shaped magnetic core portion, said core portions being assembled to define a transducing gap therebetween, said assembled core portions providing a substantially closed magnetic transducing circuit forming an inner space between said cores;

each said core portion further having a keyway providing at least one recess contiguous with said inner space, said keyways being located in a confronting relationship on opposite sides of a transducing gap plane and in the proximity of a rear portion of said transducing gap; and a nonmagnetic bond provided in at least a portion of said inner space including said recesses for joining said core portions together.

21. The transducer assembly of claim 20 wherein said confronting keyways provided in the C-shaped core portions are in the form of protrusions extending outwardly from said core portions into said inner space and said keyways in the I-shaped core portions are in the form of grooves extending into said core portions from said inner space.

22. A dual gap magnetic transducer assembly having one or more transducing channels comprising:

each channel having two corresponding generally C-shaped magnetic core portions in confronting relationship with each other and a generally I-shaped magnetic core portion arranged between said C-shaped core portions, respectively, said respective core portions being assembled to define respective transducing gaps between said respective C-shaped core portions and said I-shaped core portion and to provide a substantially closed dual gap magnetic transducing circuit forming respective inner spaces between each C-shaped and the I-shaped core portion, respectively;

each said core portion further having a keyway providing at least one recess contiguous with one said inner space, said keyways being located in a confronting relationship with each other on each side of a rear portion of each said transducing gap and in proximity thereto; and a nonmagnetic bond provided in at least a portion of said inner space including said recesses provided by said keyways for joining said respective core portions together.

23. The transducer assembly of claim 22 wherein said keyways provided in said C-shaped magnetic core portions are in the form of protrusions extending outwardly from diverging inner sides thereof into said inner space and wherein said keyways provided in said I-shaped magnetic core portions are in the form of grooves extending into said core portions from said inner space, respectively.

24. A method of making a magnetic transducer assembly comprising the steps of:

forming at least two separate magnetic core portions and forming on two of said core portions corresponding transducing gap defining surfaces;

forming a keyway in at least one said core portion extending at an inner side thereof;

assembling said core portions to form a substantially closed magnetic circuit defining a transducing gap while providing an inner space substantially enclosed by inner sides of said assembled core portions, said keyway forming a recess contiguous with said inner space; and filling at least a portion of said inner space including said recess with a nonmagnetic bonding material to join said separate core portions.

25. A method of making a magnetic transducer assembly comprising the steps of:

forming at leat two separate magnetic core portions and forming on two of said core portions corresponding transducing gap defining surfaces;

forming a keyway in at least two said core portions extending at respective inner sides of said core portions;

assembling said core portions to form a substantially closed magnetic circuit defining a transducing gap while providing an inner space substantially enclosed by inner sides of said assembled core portions, said keyways forming respective recesses contiguous with said inner space; and filling at least a portion of said inner space including said recesses with a nonmagnetic bonding material to join said separate core portions.

26. The method of claim 25 wherein the step of forming a keyway comprises forming a protrusion extending from said inner side outwardly of said core portion or forming a groove extending inwardly from said inner side into said core portion, respectively.

27. The method of claim 26 wherein said protrusion or groove has a substantially triangular cross section, respectively.

28. The method of claim 26 wherein said protrusion or groove has a substantially circular cross section, respectively.

29. The method of claim 26 wherein said protrusion or groove has a substantially polygonal cross section, respectively.

30. The method of claim 26 wherein the step of forming a keyway comprises forming at least two confronting keyways in at least two separate core portions.

31. The method of claim 30 wherein said confronting keyways are located at opposite sides of a transducing gap plane.

32. The method of claim 31 further comprising forming said confronting keyways in the proximity of a rear portion of the transducing gap.

33. The method of claim 25 wherein the nonmagnetic bonding material is epoxy.

34. The method of claim 25 wherein said separate core portions having said keyways are made of a laminated magnetic material.

35. The method of claim 25 wherein said separate core portions having said keyways are made of a laminated metallic magnetic material.

36. The method of claim 25 wherein:

the step of forming said separate core portions comprises forming two corresponding front core portions having said transducing gap defining surfaces, forming diverging inner sides extending from a rear portion of said surfaces and forming a corresponding back core portion for accommodating a transducing winding; and the step of forming a keyway comprises forming a keyway at said diverging inner side of each said front core portion in a confronting relationship with each other and wherein said recesses provided by said keyways have walls forming acute angles with said diverging inner sides and said transducing gap plane, respectively.

37. A method of making a magnetic transducer assembly comprising the steps of:

forming two corresponding separate magnetic front core portions having confronting transducing gap defining surfaces;

forming on each front core portion a respective inner side diverging from a rear portion of said transducing gap defining surface;

forming keyways extending at said diverging inner sides of both said magnetic front core portions which keyways are in confronting relationship with each other across a transducing gap plane when said respective front core portions are assembled with said gap defining surfaces abutting;

assembling said respective front core portions with a corresponding magnetic back core portion to form a substantially closed magnetic circuit defining an inner space and wherein said keyways define recesses contiguous with said inner space; and filling at least a portion of said inner space including said recesses with a nonmagnetic bonding material to bond said core portions together.

38. The method of claim 37 wherein the step of forming keyways comprises forming a protrusion extending outwardly from said inner side of said core portion or forming a groove extending inwardly from said inner side into said core portion, respectively.

39. A method of making a magnetic transducer assembly comprising the steps of:

forming two separate corresponding generally C-shaped magnetic core portions each having a confronting transducing gap defining surface;

forming on each said core portion a respective inner side diverging from a rear portion of said transducing gap defining surface;

forming corresponding keyways extending at said diverging inner sides of both said magnetic front core portions which keyways are in confronting relationship with each other across a transducing gap plane when said corresponding magnetic core portions are assembled;

assembling said corresponding magnetic core portions with said transducing gap defining surfaces abutting to form a substantially closed magnetic circuit defining an inner space and wherein said keyways define recesses contiguous with said inner space; and filling at least a portion of said inner space including said recesses with a nonmagnetic bonding material to bond said core portions together.

40. The method of claim 39 wherein the step of forming corresponding keyways comprises forming each keyway as a protrusion extending outwardly from said inner side of said core portion or forming a groove extending inwardly from said inner side into said core portion, respectively.

41. The method of claim 39 further comprising the steps of forming further inner sides diverging from a rear portion of a rear gap and providing further corresponding keyways at said further inner sides in confronting relationship with each other at opposite sides of said transducing gap plane.

42. A method of making a magnetic transducer assembly comprising the steps of:

forming a generally C-shaped magnetic core and a corresponding generally I-shaped magnetic core, and forming on each respective core a corresponding transducing gap defining surface, said C-shaped core having an inner side diverging from a rear portion of said transducing gap defining surface;

forming respective confronting keyways at said diverging inner side of said C-shaped core and at an inner side of said I-shaped core;

assembling said respective C and I-shaped cores with said corresponding transducing gap defining surfaces abutting to form a substantially closed magnetic transducing circuit forming an inner space between said assembled cores and wherein said keyways define recesses contiguous with said inner space; and filling at least a portion of said inner space including said recesses with a nonmagnetic bonding material to join said cores together.

43. The method of claim 42 wherein the step of forming said confronting keyways comprises forming a protrusion extending outwardly from said diverging inner side of said C-shaped core and forming a groove extending inwardly from said inner side into said I-shaped core, respectively.

44. A method of making a multichannel magnetic transducer assembly comprising the steps of:

forming a plurality of symmetrical magnetic dual front core portions having respective transducing gap defining surfaces at opposite ends thereof and forming respective keyways extending from a diverging inner side of each said dual front core portion in the proximity of a rear portion of each said transducing gap forming surface;

forming a dual front core carrier from a nonmagnetic material and providing a plurality of parallel slots therein;

inserting and securing said dual front core portions in said slots to obtain a dual front core assembly;

assembling and firmly holding together two corresponding dual front core assemblies with said transducing gap defining surfaces at each end abutting to precisely define respective transducing gaps therebetween, said assembled dual front core portions having inner sides defining an inner space, said keyways providing recesses contiguous with said inner space;

applying a nonmagnetic bonding material to respective portions of said inner space including said rear portions of said transducing gaps and at least one said recess on opposite sides of each said gap, respectively;

separating said assembled dual front core assemblies into two corresponding portions each including one said transducing gap to obtain a multichannel front core assembly;

providing a multichannel magnetic back core assembly with transducing windings and corresponding to said multichannel front core assembly;

assembling and firmly holding together said front and back core assemblies with said front and back cores in precise alignment; and applying a nonmagnetic bonding material to said front and back core assembly to fill respective areas between the respective channels of said multichannel assembly including a remaining portion of said inner spaces and of said recesses formed by said keyways.

45. The method of claim 44 wherein said dual front core portions are made of laminated magnetic material.

46. The method of claim 45 wherein said dual front core portions are made of laminations provided by chemical milling.

47. The method of claim 45 wherein said dual front core portions are made of laminations provided by stamping.

* * * * *